(12) United States Patent
Prevost

(10) Patent No.: US 6,551,689 B1
(45) Date of Patent: Apr. 22, 2003

(54) SYNTHETIC GRASS WITH RESILIENT GRANULAR TOP SURFACE LAYER

(75) Inventor: Jean Prevost, Côte St-Luc (CA)

(73) Assignee: Fieldturf Holdings Inc., Montreal (CA)

( * ) Notice: Subject to any disclaimer, the term of this patent is extended or adjusted under 35 U.S.C. 154(b) by 191 days.

(21) Appl. No.: 09/598,149

(22) Filed: Jun. 21, 2000

Related U.S. Application Data

(63) Continuation-in-part of application No. PCT/CA99/00704, filed on Aug. 3, 1999.

(51) Int. Cl.[7] .................................................. B32B 3/10
(52) U.S. Cl. .................. 428/143; 428/147; 428/150; 428/149; 428/17; 428/87; 428/92; 428/402
(58) Field of Search ............................ 428/17, 92, 87, 428/15, 141, 143, 147, 149, 150, 402

(56) References Cited

U.S. PATENT DOCUMENTS

| | | | |
|---|---|---|---|
| 3,617,413 A | 11/1971 | Elbert | |
| 4,337,283 A | 6/1982 | Haas, Jr. | |
| 4,396,653 A | 8/1983 | Tomarin | |
| 4,819,933 A | 4/1989 | Armond | |
| 5,326,192 A | 7/1994 | Freed | |
| 5,850,708 A | * 12/1998 | Bergevin | |
| 5,958,527 A | 9/1999 | Prevost | |
| 6,299,959 B1 | * 10/2001 | Squires et al. | |

\* cited by examiner

*Primary Examiner*—Archene Turner
*Assistant Examiner*—Wendy Boss
(74) *Attorney, Agent, or Firm*—Birch, Stewart, Kolasch & Birch, LLP

(57) ABSTRACT

A synthetic grass assembly for installation on a supporting soil substrate includes a pile fabric with a flexible sheet backing and rows of upstanding synthetic ribbons representing grass blades, extending upwardly from an upper surface of the backing. An infill layer of two distinct graded courses of particulate material is disposed interstitially between the upstanding ribbons upon the upper surface of the backing and of a depth less than the length of the ribbons. A bottom course of intermixed hard sand and resilient rubber granules with substantially identical particle size distribution characteristics is installed upon the backing and a top course exclusively of resilient rubber granules is placed upon the bottom course.

19 Claims, 5 Drawing Sheets

SYNTHETIC GRASS WITH RESILIENT GRANULAR TOP SURFACE LAYER

This application is a Continuation-In-Part of PCT International Application No. PCT/CA99/00704 filed on Aug. 3, 1999, which designated the United States and on which priority is claimed under 35 U.S.C. §120, the entire contents of which are hereby incorporated by reference.

TECHNICAL FIELD

The invention is directed to a synthetic grass with grass-like ribbons forming a lattice enmeshing a particulate infill having a bottom layer of equally sized sand and rubber granules, and a top layer of rubber granules only.

BACKGROUND OF THE ART

Maintenance of natural grass turf on athletic playing or landscaped areas is expensive, natural grass does not grow well within shaded enclosed stadiums and continuous heavy traffic wears out areas in the natural turf surface. Natural turf surfaces deteriorate under heavy use and exposed soil creates an undesirable accumulation of water and mud. Synthetic grasses therefore have been developed in order to reduce the expenses of maintaining heavily used athletic playing areas, to render playing surfaces more uniform, and increase the durability of the grass surface, especially where professional sports are involved.

Synthetic grass is installed with a carpet-like pile fabric having a flexible backing laid on a well drained compacted substrate, such as crushed stone or other stabilized base material. The pile fabric has rows of upstanding synthetic ribbons representing grass blades extending upwardly from the top surface of the backing.

Of particular interest to the present invention are the various formulations for granular resilient fill that are placed between the upstanding ribbons on the upper surface of the backing to simulate the presence of soil. Most prior art systems involve some use of hard particles such as sand or crushed slag particles, together with resilient particles such as crumb rubber particles or foam backing to provide resilience. The optimal choice of particle sizes, particle shape, particle composition and installation in multiple layers or courses is a feature of the present invention.

U.S. Pat. No. 4,337,283 to Haas, Jr. discloses a homogeneous infill mixture to imitate soil that is made of fine hard sand particles mixed with 25% to 95% by volume resilient particles to provide an improved resilient and less abrasive infill. Such resilient granular material may include mixtures of granulated rubber particles, cork polymer beads, foam rubber particles, vermiculite, and the like.

U.S. Pat. No. 4,396,653 to Tomarin discloses a non-homogeneous infill with rubber particles forming a base layer and sand particles forming a top layer. The rubber particles provide inner resiliency to the surface. The sand layer is exposed and forms a stabilizing cover layer for the underlying rubber particle layer.

A number of disadvantages result from the use of a uniformly mixed granular infill as in the Haas system where hard sand particles and resilient rubber particles are mixed and blended in a uniform proportion throughout the depth of the infill. Synthetic grass infill, for example, may comprise a mixture of 60% by weight of sand and 40% granulated rubber particles uniformly mixed and deposited between the upstanding synthetic grass ribbons to a depth of 1 to 3 inches.

A high percentage of sand is preferred to minimize the cost of such systems, since rubber particles are relatively expensive compared to sand. The sand particles also provide an improved degree of drainage that is needed where the synthetic grass surface is not in an enclosed stadium for example. Rubber particles tend to impede the free flow of water, whereas the capillary action of the sand particles draws surface moisture downwardly due to the differences in surface tension characteristics between rubber and silica sand.

However, in both the Haas and Tomarin systems, abrasive hard sand particles present in the top surface layer of infill causes problems where such as games of football, rugby, soccer, field hockey, baseball are played since players repeatedly fall down or are knocked down on the playing surface. In such applications, there is a need to protect players from skin abrasion caused by the hard sand in the granular infill and from sand spraying into the players eyes, ears and mouth.

The conventional infill is a mixture of sand and rubber particles. The rubber particles are compressed and released when a ball hits the surface or an athlete steps on the surface. In the case of conventional soil, the soil and humus particles provide some natural resilience but the rebound is more gradual due to moisture, small particle size and relatively low natural resilience. In the case of synthetic infills, the particles are relatively dry and do not bond together. The rubber particles have a spring-like rapid resilient rebound that tends to hurl adjacent sand particles and rubber upwardly under force.

The synthetic infill is continuously subjected to water flow and impact forces that tend to dislodge or segregate the particles, such as from rainfall, flooding, the impact of bouncing balls, vibration and impact from the feet and bodies of players in contact with the top surface of the infill. A top layer with a high proportion of sand will result in spraying of sand particles when a ball or player impacts with the top surface of the infill. When soccer balls roll on the infill surface, if any sand particles are present at the top surface, sand particles are lifted by the rolling ball by the suction force of air flowing around the spinning ball and by static electric attraction. As a result the smaller sand particles on the top surface of the infill are lifted and sprayed in a "rooster tail" pattern behind the rolling ball. Over time, areas of continuous sand spray or ball impact will result in visible sand on the playing surface. It is considered undesirable to have light colored sand visible in the synthetic grass surface and, especially when clouds of sand are visible on such impacts. In addition, exposed sand granules are highly abrasive to the skin when players fall or slide on the top surface, and could irritate eyes, ears, nose and mouth when sprayed, inhaled or ingested.

A further disadvantage of conventional infills is that abrasive sand particles remain on the top surface of the synthetic grass and players on the surface who come in contact with the sand particles experience skin abrasion. Over time, due to the dynamics of water, vibration and impact, the smaller sand particles will tend to settle toward the bottom of the infill layer and larger more abrasive sand particles will rise to the top surface. The small sand particles tumble downward in the voids between larger particles under the influence of vibration, water and gravity. Smaller particles accumulate at the lower portion of a granular infill layer and tend to compact together. The larger sand particles remain at the top of the granular layer and large particles are highly abrasive to human skin relative to the smaller particles.

As a result, over time the abrasive nature of the synthetic system is increased and may result in particular areas of the playing surface which experience heavy traffic being more abrasive than other areas. Conventionally used hard particles and resilient particles have angular surfaces. It has been found however that angular particles tend to compact together more than spherical or rounded particles since the friction between sharp angular surfaces is greater. In addition, where a wide range of particle sizes is used, the smaller particles fill in the interstices between the larger particles and increase the degree of compaction.

When shredded rubber, or conventional ground rubber are used the rubber particles have irregular surfaces often with fibrous protrusions that trap air and hold water with surface tension. When the infill is rained on or flooded, the air trapped by the lightweight rubber particles causes the rubber particles to float. This is undesirable since the rubber may wash down a drain with the surface water flow, and the floating rubber separates from the heavier sand in the infill mixture thereby leading to particle segregation, sand compaction and loss of the resilience of the infill.

Where sand is used for construction purposes such as road building or in concrete mixes, it is highly desirable to have a wide range of particle sizes specifically because a mix of small and large particles will result in small particles filling of the interstices between large particles, increased inter-particle contact, superior compaction and therefore a higher load bearing capacity. Where sand or granular aggregates are used in construction applications, vibratory compactors are employed and moisture content is controlled to produce maximum soil compaction and density.

However, where sand is used as a component of a resilient infill between the interstices of synthetic grass, excessive compaction is highly undesirable. A high degree of compaction of sand and contamination of the infill by airborne dirt and dust lead to unwanted changes in the resiliency of the infill over time as a result of use which may vary considerably over the synthetic grass surface from areas of high use to areas of low use. Uniform consistent resilience, elimination of maintenance and predictable performance of the infill are the goals rather than high load bearing strength.

The conventional solution to the compaction and separation of infill particles is to periodically brush the synthetic grass. Brushing serves to break up compacted material and remix the top surface restoring the original composition of the infill mixture as much as possible. Brushing increases the cost of maintenance, exposes synthetic ribbons to significant wear, and is at best a temporary solution since eventually the conventional infill compacts again and must be brushed regularly.

The proper choice of spacing between rows of grass ribbons has also proven to be problematic. Quite often the major complaint of professional athletes is that cleats on shoes do not release consistently from densely packed, matted, tightly woven or knitted synthetic sport grass surfaces, causing knee and ankle injuries. Older artificial grass surfaces were built much like indoor carpet surfaces with very closely spaced upstanding fibers extending from a woven base with resilient underlay. These fiber surfaces were designed to remain upstanding and avoid matting when stepped upon. Therefore to achieve this result, the fibers were spaced extremely close together. However, the cleats on athletic shoes often did not release properly especially when the foot was spun on the surface, thereby resulting in knee and ankle injuries.

On the other hand, where pure sand is used as a surface, in equestrian surfaces for example, the surface is relatively unstable and sand particles displace easily. To stabilize such surfaces, U.S. Pat. No. 4,819,933 to Armond (Fibresand Limited) provides a mixture of sand with a relatively small percentage by weight of straight synthetic fibers randomly distributed and cross-linking in a loose displaceable network. The fibers serve to distribute concentrated loads, hold the sand together under the weight of horses hooves, athletic players' feet, wheeled vehicles or implements. U.S. Pat. No. 5,326,192 to Freed (Synthetic Industries, Inc.) also provides a method of improving the appearance and performance characteristics of a turf surface by working discreet bunches of synthetic fibers into the soil surface.

Granular infill combined with upstanding grass-like synthetic ribbons address the disadvantages of the above systems to a degree by providing a granular synthetic surface intermingled with the upstanding fibers extending from a fabric backing to better imitate a natural soil, embedded roots and grass. When the cleats on an athlete's shoe embed in the granular infill, the loose particles shift and displace somewhat like natural soil. At the same time the upstanding synthetic grass ribbons enmesh with the loose particles and the cleats to reduce or prevent slipping. Without the synthetic ribbons, the loose particles would be very difficult to run on much like a dry sand natural beach surface whereas a dense mat of fibers would ensnare the cleats preventing release and possibly causing personal injury.

Therefore the combined structure of upstanding ribbons and loose particulate infill must be balanced or optimized to provide a desirable playing surface. When the ribbons are densely packed together, the cleats cannot release properly, but when the ribbons are spaced too far apart, adequate traction and stability is not available. Due to the high cost of artificial grass installations, and risk of injury to highly skilled and highly paid athletes, a predictable and reproducible artificial grass performance is required.

Synthetic grass surfaces have also been constructed with infill substantially of rubber only. Rubber particles are relatively light, and shredded particles have fibrous surfaces that trap air bubbles. As a result when flooded, the rubber particles of some conventional installations have floated on the surface of water draining off the synthetic grass surface. Rubber particles drain away or are displaced resulting in areas of the synthetic grass which have depleted infill thickness. A lack of uniform infill thickness and resilience across the surface can result in injuries and liability for the owner of the athletic field.

Despite several different rubber and sand infill compositions and fiber structures in the prior art, several significant disadvantages remain as noted above.

It is an object of the present invention to provide an infill that will retain its properties throughout use without substantial segregation or compaction of the infill and with a reduced requirement for periodic brushing of the surface.

It is a further object of the invention to enhance the resilience and reduce the abrasive nature of conventional granular infills filling the interstices of the synthetic grass ribbons while enabling the cleats of athletic shoes to properly release without serious risk of injury.

It is a further object of the invention to eliminate the spraying of sand particles and undesirable visible sand on the infill surface.

DISCLOSURE OF THE INVENTION

The invention provides a novel synthetic grass assembly for installation on a supporting soil substrate to provide a surface that combines the look and feel of natural turf with the wear resistance of synthetic grass. Although the description uses an athletic playing field as an example, the invention is equally applicable to any area suitable for grass cover such as high traffic landscaped areas, road and highway medians, indoor gardens or golf greens, and equestrian surfaces.

The grass assembly includes a pile fabric with a flexible sheet backing and rows of upstanding synthetic ribbons representing grass blades, extending upwardly from an upper surface of the backing. A unique infill layer of two graded courses of particulate material is disposed interstitially between the upstanding ribbons upon the upper surface of the backing and at a depth less than the length of the ribbons.

The ribbons are tufted through the water permeable fabric backing and have intermittent longitudinal slits in a predetermined pattern. During installation of the infill, the ribbons are brushed lightly to return the ribbons to an upstanding position, from an initially matted position that results from the compression of ribbons due to rolling of the tufted fabric for shipping and storage after manufacture. The ribbons may be about one inch wide with several rows of slits across their width. The light brushing tends to open a lower portion of the ribbons and extend the slits open forming laterally linked strands disposed in a lattice structure enmeshing the surrounding particulate infill. Once all the infill is installed, the upper portion of the ribbons extending above the infill layer are brushed aggressively. The ribbons are longitudinally split by the brushing action along the slits into several individual free-standing strands of a thinner width resembling grass blades.

The invention recognises that the granular infill is a dynamic system of continuously moving hard and resilient particles of different sizes and with different physical properties under the influence of impact and vibration from play activity, surface maintenance and weather precipitation. The invention accommodates such dynamic activity in a number of ways.

The top surface is kept substantially sand free using a pure rubber particle top course of relatively large particles, preferably substantially larger than those particles in the bottom layer. Any smaller sand particles that migrate up to the top surface from the displacement action of cleats will then be able to percolate, through the voids between the larger top surface particles, downward back to the bottom course under the influence of water, vibration and gravity. A bottom course of sand and rubber mixed together is provided beneath the pure rubber top course for additional resilience, moisture drainage and as a ballast for stabilisation of the fabric backing.

The particle shapes are substantially spherical to reduce inter-particle contact friction, improve drainage and prevent compaction. The spherical shape reduces resistance to particle displacement and therefore reduces the degree of compaction compared to conventional angular particles. In terms of the Krumbein sphericity standard, known to those skilled in the art, the particle shapes are broadly in the range of 0.5 to 0.99 but preferably in the range between 0.6 and 0.9 being well rounded or substantially spherical.

The particle size distribution for hard sand and resilient rubber particles in the bottom course are chosen to be substantially identical to each other and preferably particle sizes are limited for sports or athletic playing surfaces to the range of 14–30 screen mesh standard. To accommodate other uses of the synthetic grass surfaces, the size of particles may range from 0.5 inches to 50 screen mesh standard. Larger particles may be used for equestrian applications up to about 0.25 inches but these large granules are too abrasive for contact with human skin. Particles smaller than 50 screen mesh standard tend to create dust and may lead to undesirable compaction, reduced rate of water percolation and particle segregation. Naturally occurring soil particles of this size range are classified as medium sand, coarse sand and fine gravel sized particles.

By "substantially identical" size distribution it is meant that when the bottom infill layer is analysed through conventional soil laboratory sieve analysis, and graphically presented on a standard sieve analysis semi-logarithmic graph (y-axis showing 0–100 percent passing the sieve size or smaller by weight and x-axis showing sieve/particle size logarithmically) the line for hard particles and the line for resilient particles are ideally superimposed on each other to a substantial extent. Therefore the hard and resilient particles have substantially equal particle sizes and the distribution of sizes is substantially the same.

The standard sieve analysis graphs are by nature an imprecise "rough and ready" measure, since natural soils vary considerably over the surface of a building site for example. The sieve analysis graphs generally do not show the largest 10% and the smallest 10% of particle sizes since these extremes are considered statistically insignificant due to the natural variation in soil particle sizes. Therefore conventionally, only the middle 80% of particles are considered when examining soil particle sizes in a sieve analysis.

Applying this practice to the invention, numerically or scientifically defined, where the particle sizes of 80% by weight of hard and resilient granules in the bottom course are distributed in a range spanning a numerical difference of 40 screen mesh standard, the particle size distribution is considered substantially identical or very well sorted. Since the sand and rubber may be graded to any specification desired, it is preferred that the numerical difference be even less such as 20 screen mesh standard to produce a more uniform infill. For example, completely spherical manufactured glass beads would have a numerical difference approaching zero. However since sand is a naturally occurring substance created from the erosion of rock, the particle size distribution and sphericity vary considerably. A numerical difference of 20 screen mesh standard may result in a particle size distribution between 10 to 30 for equestrian surfaces or between 20 to 40 for athletic playing surfaces, for example.

In practice, the most inexpensive hard particulate material is usually sand that is found in a naturally segregated deposit and/or has been mechanically graded to suit various common construction uses, such as for use in concrete mixes and roadbed construction. The demand for sand to be used for artificial grass installation is relatively low and therefore if a design calls for a specially segregated or graded sand particle size distribution, the cost of such material would be increased somewhat.

When deciding on the specific materials to be used in any location, it is preferable to use whatever acceptable sand is readily available near to the installation site. It is a relatively simple matter when purchasing resilient particles to specify the resilient particle size distribution such that it is within the ranges discussed above and superimposed on the measured sand particle size distribution. Resilient particles must be processed, ground and shipped from a manufacturing facility no matter where the installation site is located. The marginal cost of manufacturing resilient particles with a particle size distribution matching the particle size distribution of the sand particles is relatively low compared to the alternative of grading the size distribution of the sand particles to match the resilient particles.

By manufacturing the resilient particles to match the size distribution of the readily available sand at the installation site, the bottom layer of infill with mixed sand and rubber particles of equally distributed sizes will result in the benefit of significantly reduced settling and separation of the particle mixture in service.

In contrast, conventional mixes of resilient particles generally have significantly larger particles than the available graded sand. As a result the lighter larger resilient particles migrate upwardly and the heavier smaller hard sand particles migrate downwardly under the combined influence of gravity, vibration, rainfall and downwardly percolating water. Segregation of differently sized particles leads to loss of optimum compaction and uneven traction in conventional mixed infill layers.

It has been found by the inventor that the separation of hard and resilient particles in the mixed bottom layer can be prevented or substantially reduced by (1) selecting hard and resilient particles of equal or substantially identical size distribution (2) selecting a relatively narrow range of particle sizes and (3) choosing generally spherical particle shapes for both hard and resilient particles. The minimal variation in particle size discourages compaction since there are no relatively smaller particles to fill the interstices between larger particles when all particles are of substantially equal size. The spherical shapes reduce resistance to inter-particle displacement and reduce the tendency of adjacent particles to lock together.

The fibrillated grass-like synthetic ribbons at the top surface tend to retain the relatively large top rubber particles in a loose net-like flexible structure. The loose criss-crossed net of fibrillated fibres also allows dislodged rubber particles to work back into the underlying top rubber course when foot traffic passes over the particles and synthetic ribbons. The combination of pure top rubber course and network of fibrillated ribbons gives the look and feel of a natural turf surface.

The synthetic ribbons between the fabric backing and the top course provide a degree of resistance to particle displacement in the mixed bottom course by forming an open net or lattice structure of vertically oriented strands laterally cross-linked together. The mixed sand and rubber bottom course provides firm resilient support for the relatively thin rubber top course. The sand content of the mixed course in particular provides the necessary weight for ballast and better drainage due to the capillary action of the sand.

The relatively thin top course that is in immediate contact with the athlete's body, has a high resilience where physical contact occurs and results in low skin abrasion due to the exclusive use of rubber. The sand content in the mixed bottom course provides ballast weight to hold the grass in place and to quickly drain the surface. Drainage is especially necessary where there is a risk of freezing and selection of a more coarse mixture for improved drainage may be required in cold climates. The resilient particles in the mixed course also provide subsurface resiliency in addition to the top surface resiliency provided by the top layer.

The choice of hard and resilient particles of substantially equal size distribution substantially reduces compaction and reduces the maintenance requirements. The top pure rubber top course will always remain substantially free of sand due to the choice of particle sizes. Sand may be displaced from the mixed bottom layer to the surface of the top layer by agitation caused by contact with the player's cleats during a game or practice session much in the same manner as conventional soil is disturbed by this action. However the size of sand particles is chosen to be smaller than the size of resilient particles in the top course. The downward washing of the displaced sand particles by rainwater draining through the top resilient surface or from the vibration and agitation of foot traffic returns the smaller sand particles to the bottom course where they came from.

The two layer installation with rubber only in the top layer and mixed sand and rubber in the lower layer produces a resilient surface at lower cost and lower thickness than conventional methods such as described in U.S. Pat. No. 4,337,283 to Haas and U.S. Pat. No. 4,396,653 to Tomarin. The prior art infill layers with large and small particles tend to compact or consolidate into a more firm compacted surface. The invention maintains its resilience even when used in thin layers since the top layer is of pure rubber granules and the mixed lower course does not tend to separate or compact. Thus a more predictable long term resiliency is created.

The synthetic ribbons can be manufactured and tufted to the fabric backing. It is preferred to slit the ribbons with relatively short longitudinal slits spaced apart across the width of the ribbons. Then after installation of the infill the upper portion of the synthetic ribbons are fibrillated, split or frayed vertically on site by passing over the installed surface with a brush. The ribbons when manufactured have a longitudinally oriented structure and therefore aggressive brushing action on the top surface tends to tear or split the ribbons into thinner grass-like strands by extending the slits longitudinally to form densely packed individual grass-like strands.

Where ribbons are brushed and split on site by brushing, the upper portions of the ribbons are frayed or split into thin grass-like strands whereas the lower portions remain intact and are merely stretched open into an expanded web, net or lattice structure, to a greater extent than when the fibres were initially tufted into the backing. A direct benefit of this lattice structure is the stabilisation of the particulate infill by intermeshing the particles between the fibrillated grass-like strands and within the expanded web-like fibre structure. The lower web-like portion stabilises the infill and the upper grass-like portion allows for cleat penetration and release, rainfall penetration and drainage, adds a slight surface resilience due to the curved grass-like strands, and captures the large resilient particles of the top course in a grass-like net structure.

On-site fibrillation of the fibres also permits a more dense top surface coverage of grass-like strands. The relatively wide ribbons with short slit perforations as initially installed can be spaced apart a sufficient distance to permit granular infill to be installed between the ribbons. When the infill has been fully installed, the brushing of the widely spaced ribbons splits them into thinner grass-like strands that fill in the gap between the ribbons and better cover the top surface of the granular infill. The dense net of criss-crossed fibrillated strands contain the large top course rubber granules while allowing cleat penetration and permitting water to drain through. The split ribbons add better grass-like strand coverage of the visible surface at a lower cost. In applications not oriented to sports uses, such as in landscaping or decorative applications, less dense fibre distributions can be used resulting in lower cost for the same visually apparent coverage as conventional closely spaced synthetic grasses.

Further details of the invention and its advantages will be apparent from the detailed description and drawings included below.

BRIEF DESCRIPTION OF THE DRAWINGS

In order that the invention may be readily understood, one preferred embodiment of the invention will be described by way of example, with reference to the accompanying drawings wherein.

DETAILED DESCRIPTION OF PREFERRED EMBODIMENTS

Figure 1:
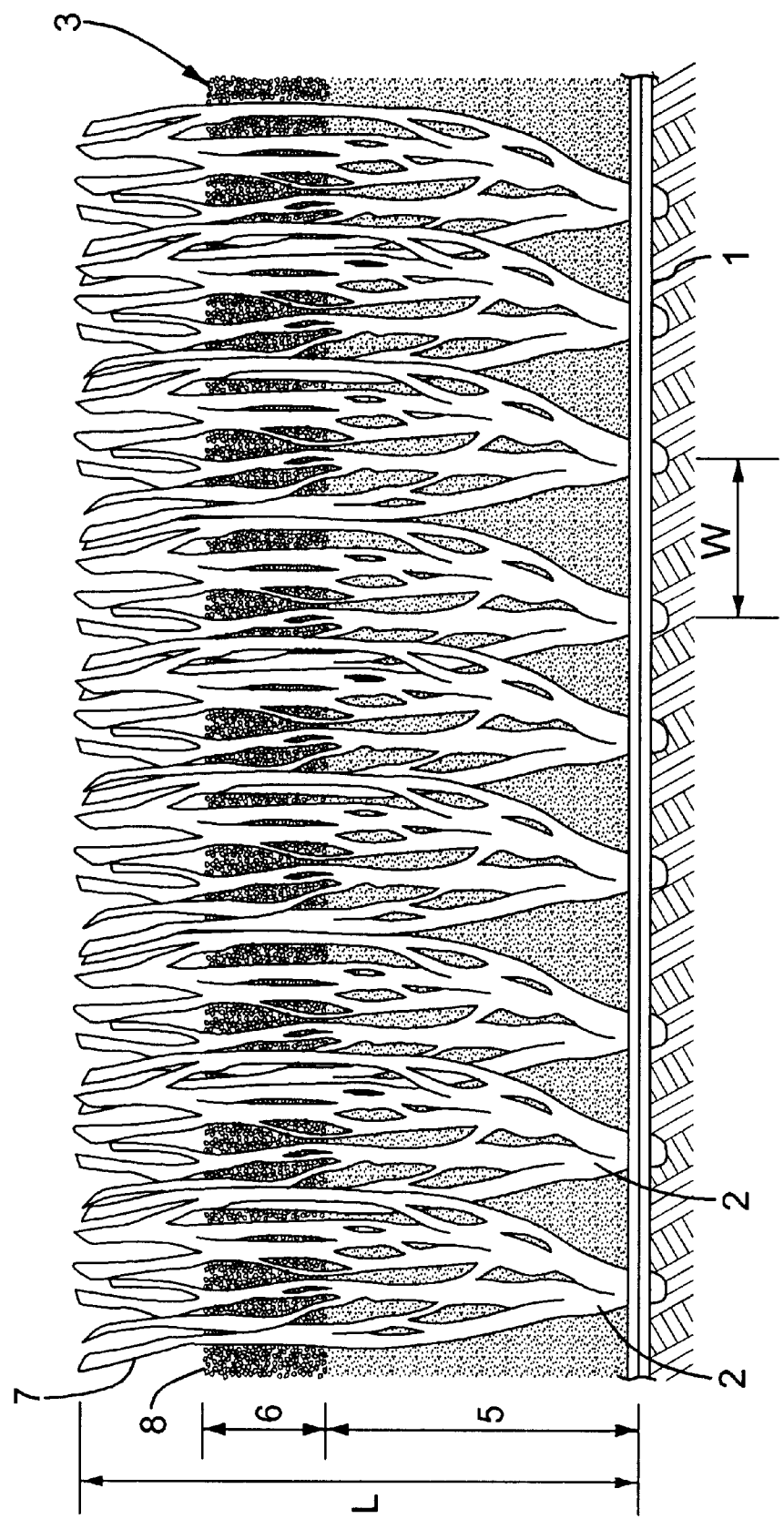
FIG. 1 is a cross-section through a synthetic grass assembly with infill installed showing the flexible sheet backing with upstanding ribbons and the infill layer built up of a top course of relatively large resilient rubber granules and a bottom course of mixed hard sand and resilient rubber granules of identical smaller particle size distribution.
Figure 2:
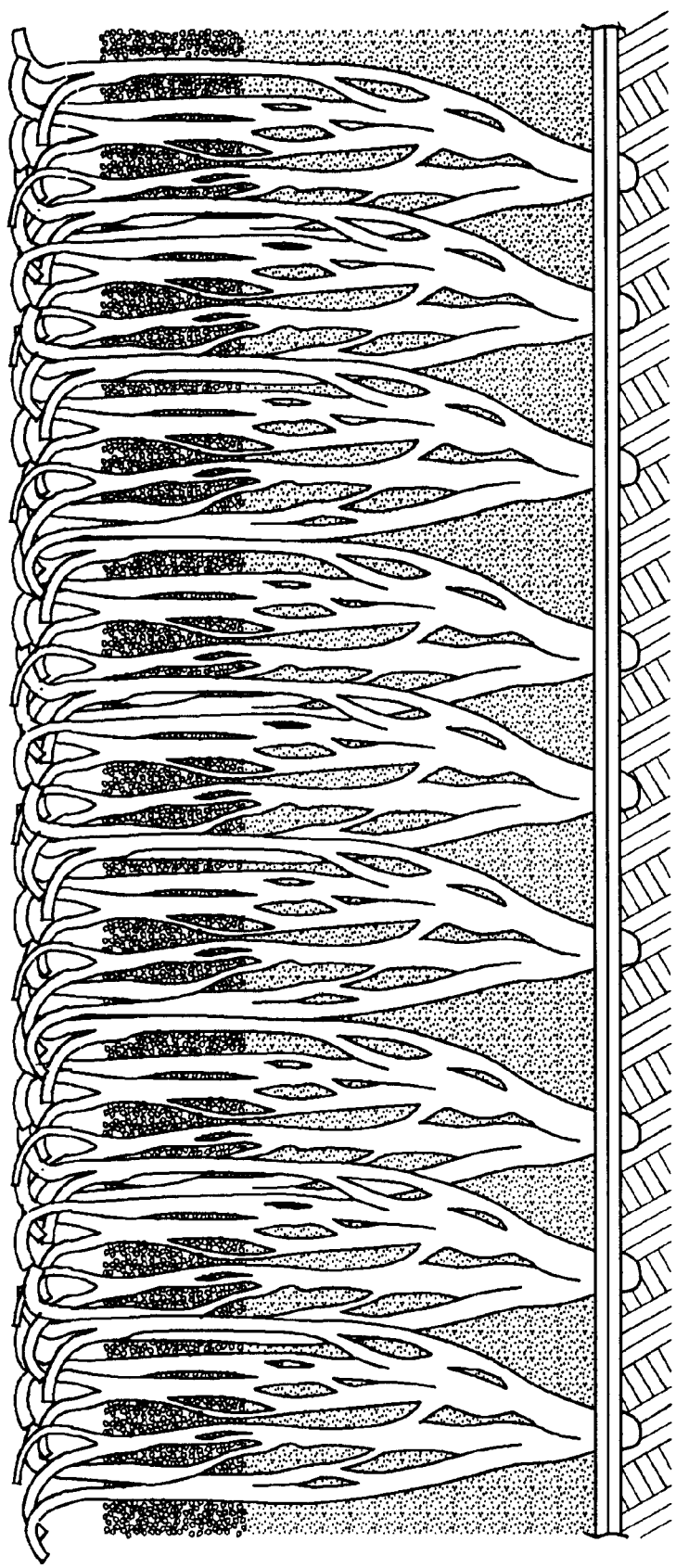
FIG. 2 is a similar cross-section showing the final configuration of the grass-like strands slightly curved as a result of aggressive surface brushing to further fibrillate the ends of the ribbons.
Figure 3:
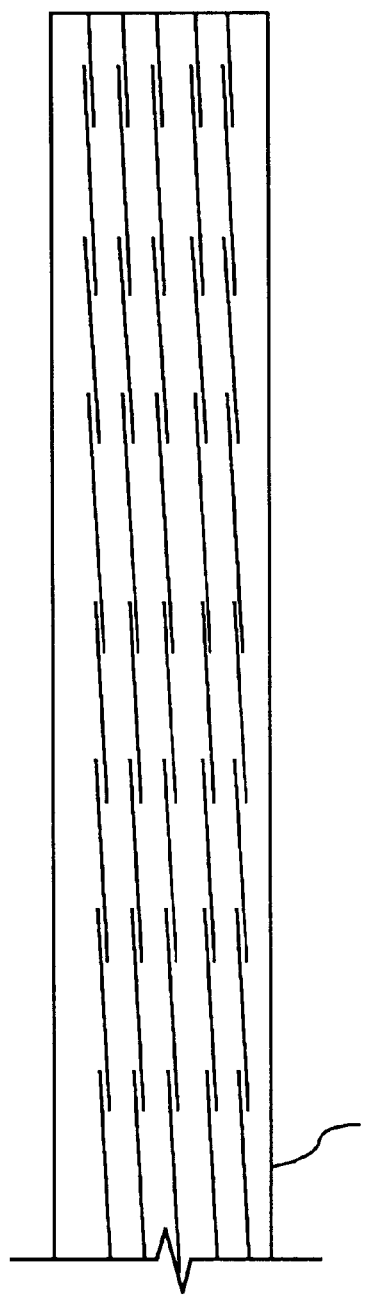
FIG. 3 is a side view of a synthetic ribbon as manufactured with a series of short longitudinally slit perforations.
Figure 4:
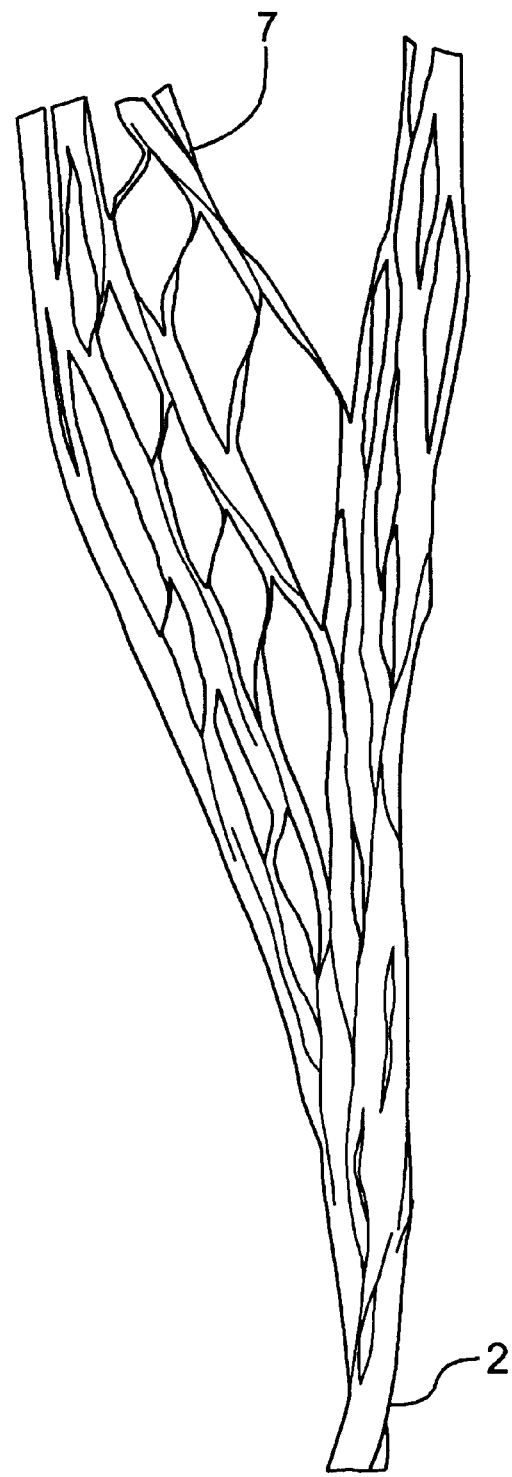
FIG. 4 is a side view of a synthetic ribbon at the lower end twisted prior to tufting into the fabric backing and at the upper end laterally stretched to reveal the web-like grass-blade structure that resulting from the lateral stretching and longitudinal extension of the slits.

With reference to FIG. 1, the invention relates to a synthetic grass assembly consisting of a pile fabric with an infill layer of particulate matter which is installed on a supporting soil substrate to provide a game playing surface.

The pile fabric includes a flexible sheet backing 1 that could include two or more layers of open weave fabric, one of which may be dimensionally stable netting to prevent stretching during installation and use. Extending upwardly from an upper surface of the backing 1 is a large number of upstanding synthetic ribbons 2. As indicated in FIG. 1, the ribbons 2 are tufted through the backing 1 spaced apart in rows by a distance W and of a length L. The length 'L' of fibres is selected depending upon the total depth (5 plus 6) of infill and the desired resilience of the completed synthetic grass assembly.

Disposed interstitially between the upstanding ribbons 2 upon the upper surface of the backing 1 is an infill layer 3 of particulate matter. The particulate matter may be selected from any number of commonly available hard granules such as: sand; hard aggregate; silica sand; gravel; slag; granulated plastic; and polymer beads. The resilient granules may be selected from: cryogenically ground rubber; rubber; cork; polymer beads; synthetic polymer foam; styrene; perlite, neoprene, ground tires, and EPDM rubber.

The infill layer 3 is made up of a top course 6 and a bottom mixed course 5. The mixed bottom course 5 is of intermixed hard sand granules and resilient rubber granules. The mix is selected on the basis distribution by volume of different sizes of hard granules and resilient granules that are substantially identical and range in size between 0.5 inches and 50 screen mesh standard. Preferably the range of particle sizes is limited to avoid small or fine particles that fill the interstices between larger particles and encourage compacting. The preferred range is between 14 and 30 screen mesh standard. Depending on the application, the range of particle sizes in the mixed course can be limited to between 10–30, 15–30 or 20–40 screen mesh standard as selected to suit design parameters. The shape of hard and resilient granules is substantially spherical and not angular as in the prior art to further discourage compaction and settling.

Figure 5:
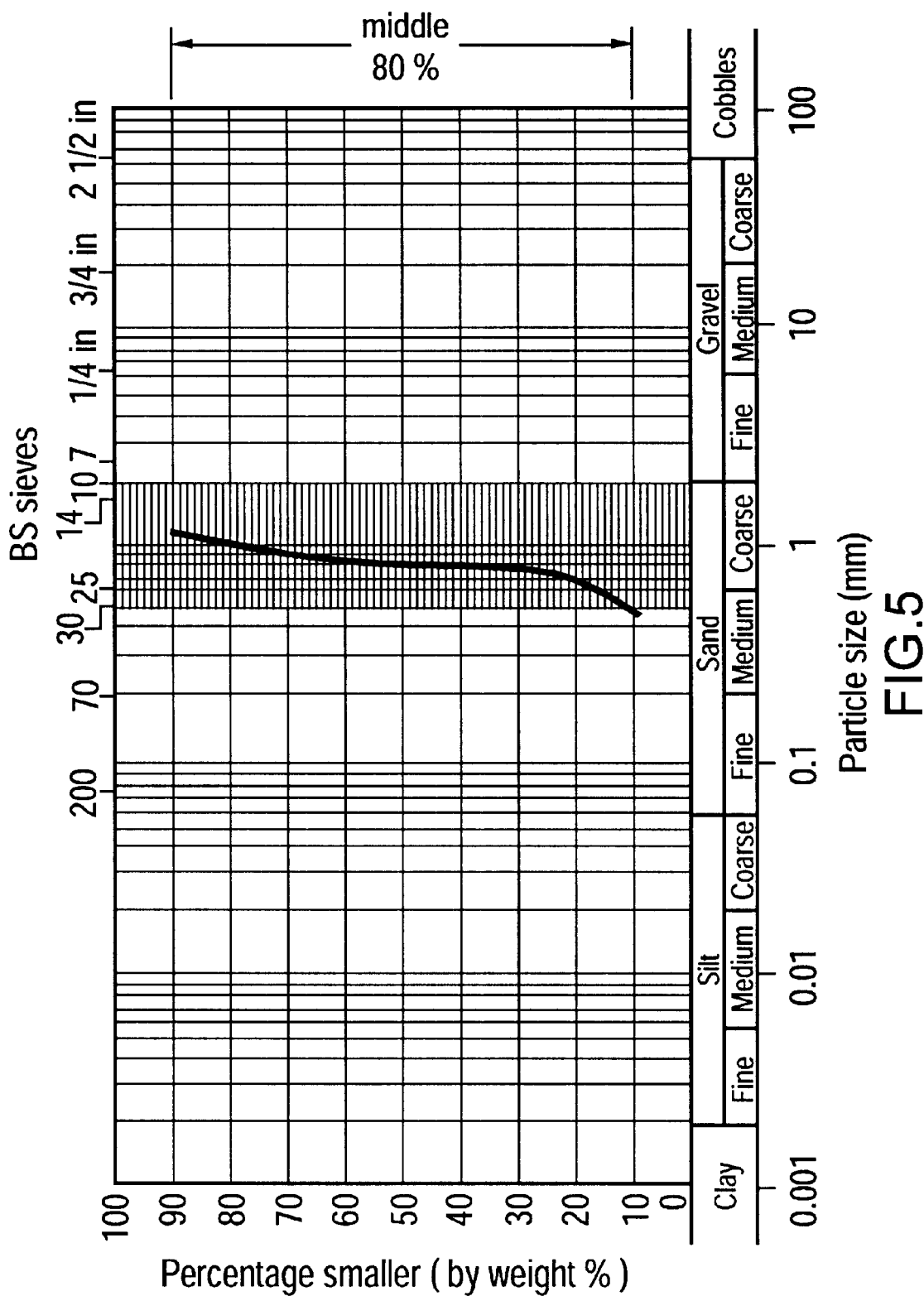
FIG. 5 is a table showing the graphical depiction of particle size distribution resulting from standard sieve analysis of infill courses.
Figure 6:
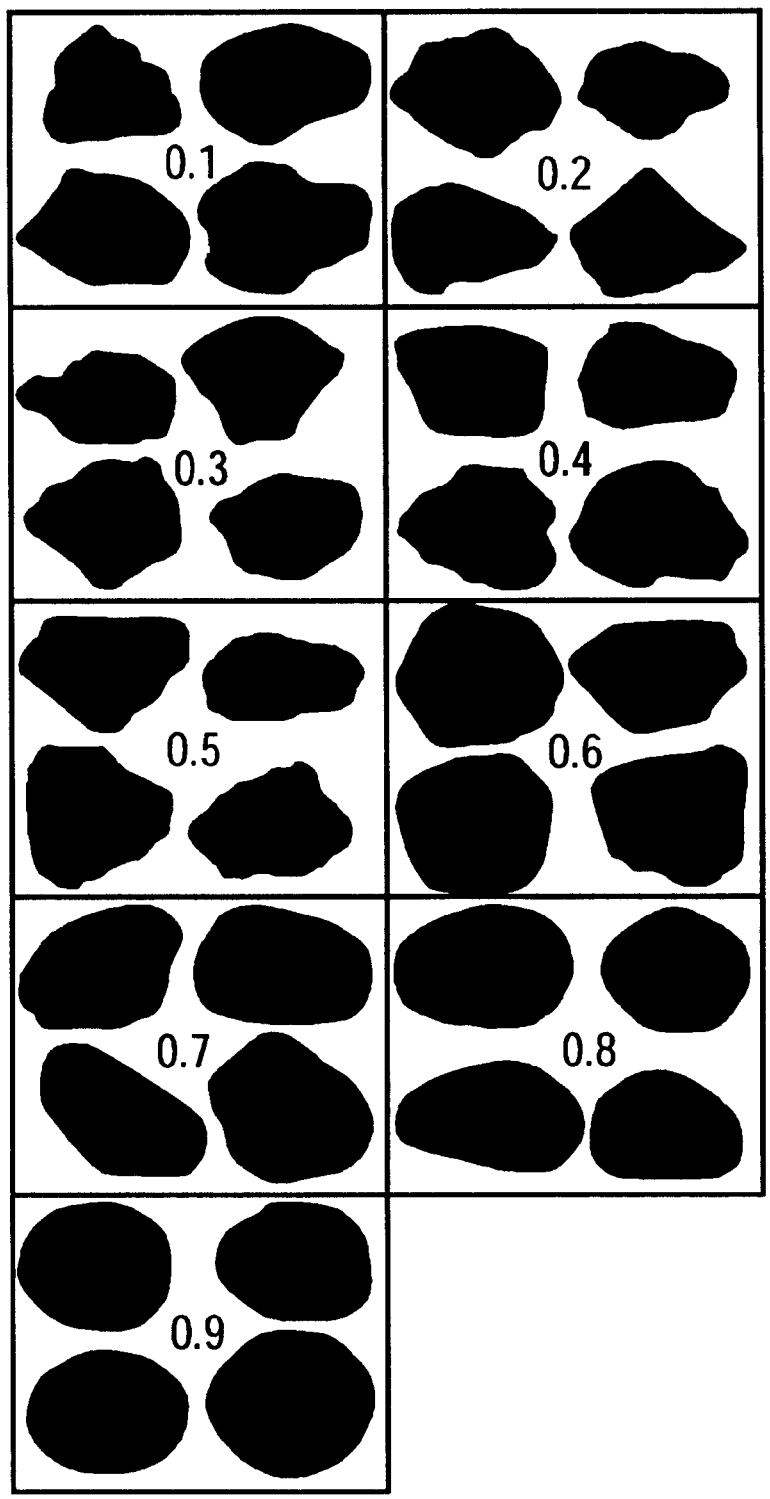
FIG. 6 is a table showing a visual representation of particles graded on the Krumbein sphericity scale.

As shown in the graph of FIG. 5, a standard screen sieve analysis is depicted with a vertical axis linear scale of "percent by weight passing the sieve size" or alternatively "percent smaller" and the horizontal axis being a logarithmic scale showing particle and/or sieve size. The example line shown in FIG. 5 indicate relatively uniform mixtures of particles with a narrow range of particle sizes. Ideally the line on FIG. 5 for sand particle size distribution and the line for rubber particle size distribution are identical and would be shown superimposed on each other. However, as an example, the 10–30 range mentioned above is graphically illustrated as a shaded zone within which any line will meet the requirements of this particle size restriction.

The top course 6 is substantially exclusively of resilient rubber granules. An upper portion 7 of the synthetic ribbons 2 extends upwardly from a top surface 8 of the top course 6. The resulting artificial grass surface can be adapted for several indoor and outdoor uses, such as: athletic playing fields; horse racing fields, playgrounds, landscaped areas, and recreational areas.

In order to deposit dual layers, brushes pass over the backing with a mixed sand and rubber material many times to ensure that the ribbons are upstanding when embedded in the infill and not submerged under the infill, and to further slightly expand the ribbons to open the slits and produce a lattice structure that stabilizes the infill preventing excessive displacement of the infill particles after installation. After the mixed lower infill layer is laid a substantially pure rubber particulate material is placed as a resilient top layer.

To deposit the bottom layer a spreader may be used and thereafter the surface is brushed to raise the nap of the pile fabric and position the ribbons 2 in a generally upright position prior to depositing the top course 6. After spreading each layer, it is necessary to brush the surface and raise the ribbons to an upstanding position as shown in the drawings.

It may be preferred that after installation of the top course 6, the upper portion 7 of the synthetic ribbons 2 is further fibrillated by aggressively passing over the surface with a brush. This operation splits the upper portions 7 and spreads the strands uniformly over the top surface 8. The manufactured width of the ribbons 2 is relatively wide such as one inch and the on-site brushing operation further splits the ribbons opening the slits longitudinally and forming thinner grass-like strands of a thinner width as illustrated. The upper ends of the ribbons 2 are brushed more vigorously to achieve the following advantages over prior art methods. Laying over of the fibrillated upper portions 7, interlocks the ribbon ends into a loose network which more realistically simulates the appearance of natural grass. The fibrillated ends impart a slight resilience since they are slightly raised or fluffed and more accurately simulate the resilience of natural grass when balls, during play, bounce on the completed surface. The bent over ends as well hide the rubber crumbs of the top course 6 from view, hold the crumb particles in place and allow a movement of dislodged crumbs back and forth between the top course 6 and upper side of the fibrillated ribbons 2. By splitting or fibrillating the ends of the ribbons 2, less surface tension is created and water more easily permeates through the top surface 8 and is drained away through the bottom course 5.

The ribbons 2 include a top structure of multiple grass-like strands fibrillated on site and an expanded web-like lower structure left substantially in their original state but mechanically expanded into a web lattice due to interaction with the infill as it is deposited. Ribbons may be chosen from fibers such as polypropylene, polyethylene, nylon and plastic. A mix of thick and thin width of fibrillated strands produces a more natural appearance and causes a ball to roll in a more predictable manner depending on the resistance of the fibers to the ball during play. Modification of the ribbon width and density in the grass will also modify the ball rolling characteristics.

The ribbons, when initially tufted to the fabric backing, may be of a width in the range of 1–3 inches, and when fibrillated the individual grass-like strands may be in the range of 1 mm to 15 mm (⅛ inch to ½ inch approx.) in width. Expressed in terms used in the art, the strands range from 800 to 5000 Denier, and the thickness of ribbons and strands range preferably from 45 to 200 microns ($\mu$).

It has been found through experiment and experience that the size and shape of hard granules and resilient granules significantly affects the turf performance characteristics. It has also been found that the spacing of ribbons and the variation in depth of infill can have strong influence on the performance of the synthetic grass assembly.

The hard and resilient particle sizes should range between 0.5 inches and 50 U.S. screen mesh standard, however preferably a narrower range of 14–30 avoids the risk of compaction. Hard granules larger than 14 screen mesh standard can be perceived as somewhat abrasive by users of the athletic surface if direct contact is made. However, since the fibres above the top surface tend to arch over and shield the user from direct contact with an arched resilient fibrous matting of synthetic fibres, somewhat larger particles can be used without perceiving the particles as abrasive. Particles smaller than 50 screen mesh standard will tend to impede the percolation of water and detrimentally affect the drainage characteristics of the infill layer 3 in relatively wet climates. In dry climates, use of smaller particles may be desirable to maintain an optimal moisture content for optimal level of compaction and resilience. Larger resilient particles (such as 14 screen mesh standard) may be used where skin contact with the surface and potential abrasion from the nature of the sport are expected. Preferably the sand is washed and graded to remove substantially all the fine particles below size 50 mesh.

The natural tendency of the large relatively light rubber particles to migrate to the top and the complementary tendency of smaller heavier sand particles to migrate to the bottom of the infill layer 3 is reduced by use of equally sized particles. Particle migration is also reduced by the interaction with the synthetic web-like ribbon structure and by the use of spherical particle shape. The bottom course of the infill retains its initial mixture of equally sized sand and resilient particles due to the selection of substantially identical particle sizes and the interference to particle movement resulting from the web-like structure of the ribbons in contact with the bottom infill layer. These characteristics of the infill tend to discourage compaction and maintain the uniform predictable resilience of the infill.

With a pure rubber resilient top course 6, resilience is provided at the contact surface where the perception of resilience actually needed. Preferably the particle size of rubber particles in the top layer 6 of infill are larger than the sand and resilient particles in the bottom layer 5. The larger particles of the top layer permit smaller particles of the bottom layer to fall back down through gaps between the large particles, and as a result, the particle size compositions of the layers remain distinct. The resilience of the final layer of infill can be fine tuned by testing resilience at the surface and gradually spreading rubber particles to marginally increase the thickness of the top course 6 and achieve the desired resilience of the final top course.

The synthetic ribbons are preferably disposed in rows spaced apart a selected minimum distance "W". Depending on the firmness desired and the degree of freedom required for cleats to rotate for various sports, the spacing "W" can vary between 2.25 inches and 0.625 inches or less. A closer spacing provides firmer support for the infill 3 whereas a wider spacing permits easier rotation of embedded cleats.

The depth of the infill layer 3 relative to the length "L" of synthetic ribbons can range from 90% to 40% however the preferred range for most applications will be 85% to 55% or 80% to 70%. For example, where the length of ribbons L is 2 inches, a depth of infill equal to 75% would be a depth of 1.5 inches (2.0×0.75=1.5) with the remaining 0.5 inches of ribbon extending above the top surface of the infill.

Although the above description and accompanying drawings relate to a specific preferred embodiment as presently contemplated by the inventor, it will be understood that the invention in its broad aspect includes mechanical and functional equivalents of the elements described and illustrated.

The embodiments of the invention in which an exclusive property or privilege is claimed are defined as follows:

1. A synthetic grass assembly for installation on a supporting substrate, the assembly comprising:
    a pile fabric with a flexible sheet backing and a plurality of upstanding synthetic ribbons of a selected length, the ribbons extending upwardly from an upper surface of the backing;
    an infill layer of particulate material disposed interstitially between the upstanding ribbons upon the upper surface of the backing and of a depth less than the length of the ribbons, the particulate material selected from the group consisting of hard and resilient granules; said infill layer further including
        a bottom course of intermixed hard and resilient granules, disposed upon the upper surface of the backing, and
        a top course substantially exclusively of resilient granules disposed upon the bottom course, an upper portion of the synthetic ribbons extending upwardly from a top surface of the top course wherein the synthetic ribbons:
            are longitudinally intermittently slit in a predetermined pattern of slits;
            an upper portion of the ribbons extending above the infill layer and longitudinally split into individual free-standing strands of a selected width to represent grass blades; and
            a lower portion of the ribbons having said slits extended open forming laterally linked strands disposed in a lattice structure enmeshing the surrounding particulate infill material.

2. A synthetic grass assembly according to claim 1, wherein the resilient granules in the top course are larger than the resilient granules in the bottom course.

3. A synthetic grass assembly according to claim 1, wherein the hard granules and resilient granules in the bottom course are of shape defined in the range of 0.5 to 0.99 on the Krumbein scale of sphericity.

4. A synthetic grass assembly according to claim 3, wherein the hard granules and resilient granules in the bottom course are in the range of 0.6 to 0.9 Krumbein scale.

5. A synthetic grass assembly according to claim 1, wherein the resilient granules are selected from the group consisting of cryogenically ground rubber, rubber, cork, polymer beads, synthetic polymer foam, styrene perlite, neoprene and EPDM rubber.

6. A synthetic grass assembly according to claim 1, wherein the hard granules are selected from the group consisting of sand, hard aggregate, silica sand, gravel, slag, granulated plastic and polymer beads.

7. A synthetic grass assembly according to claim 1, wherein the particulate material of the infill comprises granules of size ranging between 0.5 inches maximum nominal diameter and 50 screen mesh standard.

8. A synthetic grass assembly according to claim 7, wherein the particle sizes of 80% by weight of hard granules and resilient granules in the bottom course are distributed in a range spanning a numerical difference of 40 in screen mesh standard.

9. A synthetic grass assembly according to claim 8, wherein the particle sizes of 80% by weight of hard granules and resilient granules in the bottom course are distributed in a range spanning a numerical difference of 20 in screen mesh standard.

10. A synthetic grass assembly according to claim 1, wherein the synthetic ribbons are disposed in rows spaced apart a selected minimum distance.

11. A synthetic grass assembly according to claim 10, wherein a maximum distance between rows of synthetic ribbons tufted in the fabric backing is 2.25 inches.

12. A synthetic grass assembly according to claim 11, wherein a maximum distance between rows of synthetic ribbons tufted in the fabric backing is 1.0 inch.

13. A synthetic grass assembly according to claim 12, wherein a maximum distance between rows of synthetic ribbons tufted in the fabric backing is 0.625 inches.

14. A synthetic grass assembly according to claim 1, wherein depth of the infill layer is in the range between 90% to 40% of the length of synthetic ribbons.

15. A synthetic grass assembly according to claim 14, wherein depth of the infill layer is in the range between 85% to 55% of the length of synthetic ribbons.

16. A synthetic grass assembly according to claim 15, wherein depth of the infill layer is in the range between 80% to 70% of the length of synthetic ribbons.

17. A synthetic grass assembly according to claim 1, wherein the synthetic ribbons are fibers selected from the group consisting of polypropylene, polyethylene, nylon and plastic.

18. A synthetic grass assembly according to claim 1, wherein the upper portion of the synthetic ribbons are fibrillated into individual strands of a width in the range between 1.0 to 15.0 mm.

19. A synthetic grass assembly according to claim 1, wherein the synthetic ribbons are of a thickness in the range between 45 to 200 microns.

* * * * *